US006594109B2

United States Patent
Renken (10) Patent No.: US 6,594,109 B2
(45) Date of Patent: Jul. 15, 2003

(54) DISC CLAMP HAVING ADJUSTABLE BALANCE RING

(75) Inventor: Frederick Paul Renken, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 129 days.

(21) Appl. No.: 09/934,164

(22) Filed: Aug. 21, 2001

(65) Prior Publication Data

US 2002/0024762 A1 Feb. 28, 2002

Related U.S. Application Data (60) Provisional application No. 60/227,616, filed on Aug. 23, 2000.

(51) Int. Cl.[7] .............................................. G11B 17/02
(52) U.S. Cl. ................................................... 360/98.08
(58) Field of Search ......................... 360/98.08, 99.05, 360/99.12

(56) References Cited

U.S. PATENT DOCUMENTS

| | | | |
|---|---|---|---|
| 4,561,035 A | * 12/1985 | McDorman et al. ......... 360/137 |
| 5,130,870 A | 7/1992 | Jabbari ..................... 360/99.08 |
| 5,333,080 A | 7/1994 | Ridinger et al. .......... 360/99.12 |
| 5,517,376 A | 5/1996 | Green ....................... 360/98.08 |
| 5,537,272 A | 7/1996 | Kazmierczak et al. .... 360/99.08 |
| 5,555,144 A | 9/1996 | Wood et al. ............... 360/98.08 |
| 5,572,382 A | 11/1996 | Kuno ........................ 360/98.08 |
| 5,731,928 A | 3/1998 | Jabbari et al. ............ 360/98.08 |
| 5,877,571 A | 3/1999 | Brooks ..................... 360/99.12 |
| 5,912,784 A | 6/1999 | Bronshvatch et al. ..... 360/98.08 |
| 5,923,498 A | 7/1999 | Moir et al. ................ 360/98.08 |
| 5,943,184 A | 8/1999 | Kelsic et al. ............. 360/98.08 |
| 6,094,804 A | 8/2000 | Chuang et al. ........... 29/603.03 |
| 6,479,912 B2 | * 11/2002 | Kikuchi et al. ................. 310/51 |
| 6,484,575 B2 | * 11/2002 | Horning et al. ................ 73/487 |

* cited by examiner

Primary Examiner—Robert S. Tupper
(74) Attorney, Agent, or Firm—Merchant & Gould P.C.

(57) ABSTRACT

A disc clamp assembly and method for balancing a spindle hub assembly within a disc drive utilizes a base piece, a balance ring retainer piece and a balance ring. The disc clamp base piece is positioned on the top surface of the rotatable spindle hub to secure a disc stack to the spindle hub. The balance ring retainer piece is attached to the top surface of the base piece and defines a peripheral rim for accepting a balance ring. The balance ring has a predetermined mass to modify the center of gravity of the spindle hub assembly toward the central axis of rotation for the spindle hub.

11 Claims, 7 Drawing Sheets

DISC CLAMP HAVING ADJUSTABLE BALANCE RING

RELATED APPLICATIONS

This application claims priority of U.S. provisional application Serial No. 60/227,616, filed Aug. 23, 2000.

FIELD OF THE INVENTION

This application relates generally to magnetic disc drives and more particularly to a disc drive disc clamp assembly having a base, retainer and balance ring.

BACKGROUND OF THE INVENTION

Disc drives are data storage devices that store digital data in magnetic form on a storage medium on a rotating information storage disc. Modern disc drives include one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g., a magnetoresistive read/write head, is used to transfer data between a desired track and an external environment. During a write operation, data is written onto the disc track and during a read operation the head senses the data previously written on the disc track and transfers the information to the external environment.

The heads are mounted via flexures at the ends of a plurality of actuator arms that project radially outward from the actuator body. The actuator body pivots about a shaft mounted to the disc drive housing at a position closely adjacent the outer circumference of the information storage discs. The pivot shaft is parallel with the axis of rotation of the spindle motor and the information storage discs, so that when the actuator arms are pivoted, the heads move in an arc across the surfaces of the information storage discs.

As briefly noted above, modern disc drives include one or more information storage discs mounted on the spindle motor. Spacers are typically mounted on the spindle motor between information storage discs to provide adequate separation between the information storage discs for allowing the actuator arms and the attached flexures to position two heads against adjacent disc surfaces. The information storage discs and spacers collectively form a disc stack, or disc pack, that is mounted on the spindle motor hub and held together with a disc clamp to form the spindle motor hub assembly.

It is critical in the disc drive industry, especially in light of increased spindle motor speeds, to not only have the disc stack secured to the spindle hub, but to have an overall balanced spindle hub assembly, i.e., where the center of gravity of the spindle hub assembly is positioned at or close to the central axis of rotation of the spindle hub. Imbalance within the spindle hub assembly may cause undue and uneven wear on the spindle motor and may result in rotational vibrations within the disc drive. Rotational vibrations may cause undesired variations in the read/write signals detected by the read/write heads and may result in unwanted noise emissions from the disc drive.

The overall balance of a spindle hub assembly results from imbalances contributed by the information storage discs, the disc spacers, the hub itself, the disc clamp and the clamping force applied by the disc clamp, or any combination of the above imbalances of the above. Improved disc clamp design has helped improve the overall balance of the spindle hub assembly, especially with regard to manufacturing of disc clamps that provide a more uniform vertical clamping force. Additionally, recent aluminum disc clamp designs have introduced a balancing structure that modifies the disc stack center of gravity to be positioned toward the central axis of spindle hub rotation. However, these newer disc clamp designs often require complex and costly fabrication methods.

Accordingly, there is a need in the art for a relatively inexpensive disc clamp having a balancing structure for balancing the spindle hub assembly.

SUMMARY OF THE INVENTION

Against this backdrop the present invention has been developed. In one embodiment, the invention is a disc clamp assembly for exerting a clamping force on a disc stack to secure the disc stack to a spindle hub, where the disc clamp assembly, disc stack, and spindle hub combine to form a spindle hub assembly. The disc clamp assembly modifies the center of gravity of the spindle hub assembly toward a central axis of rotation of the spindle hub, and includes a disc shaped base piece having a top surface and a bottom surface, the bottom surface for contacting a top surface of the spindle hub. The base piece also includes a peripherally located annular ring for contacting a top information storage disc of the disc stack.

The disc clamp assembly also includes a disc shaped retainer piece engaged to the top surface of the base piece, the retainer piece having a peripheral balance ring receiving portion for receiving a balance ring. The balance ring having a first end and a second end with a gap formed therebetween, where the predetermined mass of the balancing ring is varied dependent on the length of the balance ring. The balance ring is secured within the peripheral balance ring receiving portion of the retainer piece to modify the center of gravity of the spindle hub assembly toward the central axis of the spindle hub.

In another embodiment, the invention is a balance ring retainer for balancing a spindle hub assembly, and includes an annular shaped central web portion for operative attachment to the spindle hub and a peripheral balance ring accepting portion for accepting a balancing ring. The balance ring has a first end and a second end a gap therebetween. The length of the balance ring determines the mass of the balance ring so that a balance ring is selected to improve the balance of the spindle hub assembly.

Finally, an embodiment of the invention is a method of balancing a spindle hub assembly within a disc drive. The method includes the steps of assembling a disc stack on a spindle hub of a disc drive spindle motor; assembling a disc clamp assembly having a base piece and a balance ring retainer piece; positioning the disc clamp assembly on the spindle hub so that the base piece engages both the spindle hub and a top surface of an information storage disc in the disc stack; determining the center of gravity of a spindle hub assembly comprising the assembly of the spindle hub, the disc stack, and the disc clamp assembly; and positioning a balance ring having a predetermined mass in the balance ring retainer piece of the disc clamp of the disc clamp assembly to move the center of gravity of the spindle hub assembly toward the central axis of rotation for the spindle hub assembly.

These and various other features as well as advantages which characterize the present invention will be apparent from a reading of the following detailed description and a review of the associated drawings.

DETAILED DESCRIPTION

Figure 1:
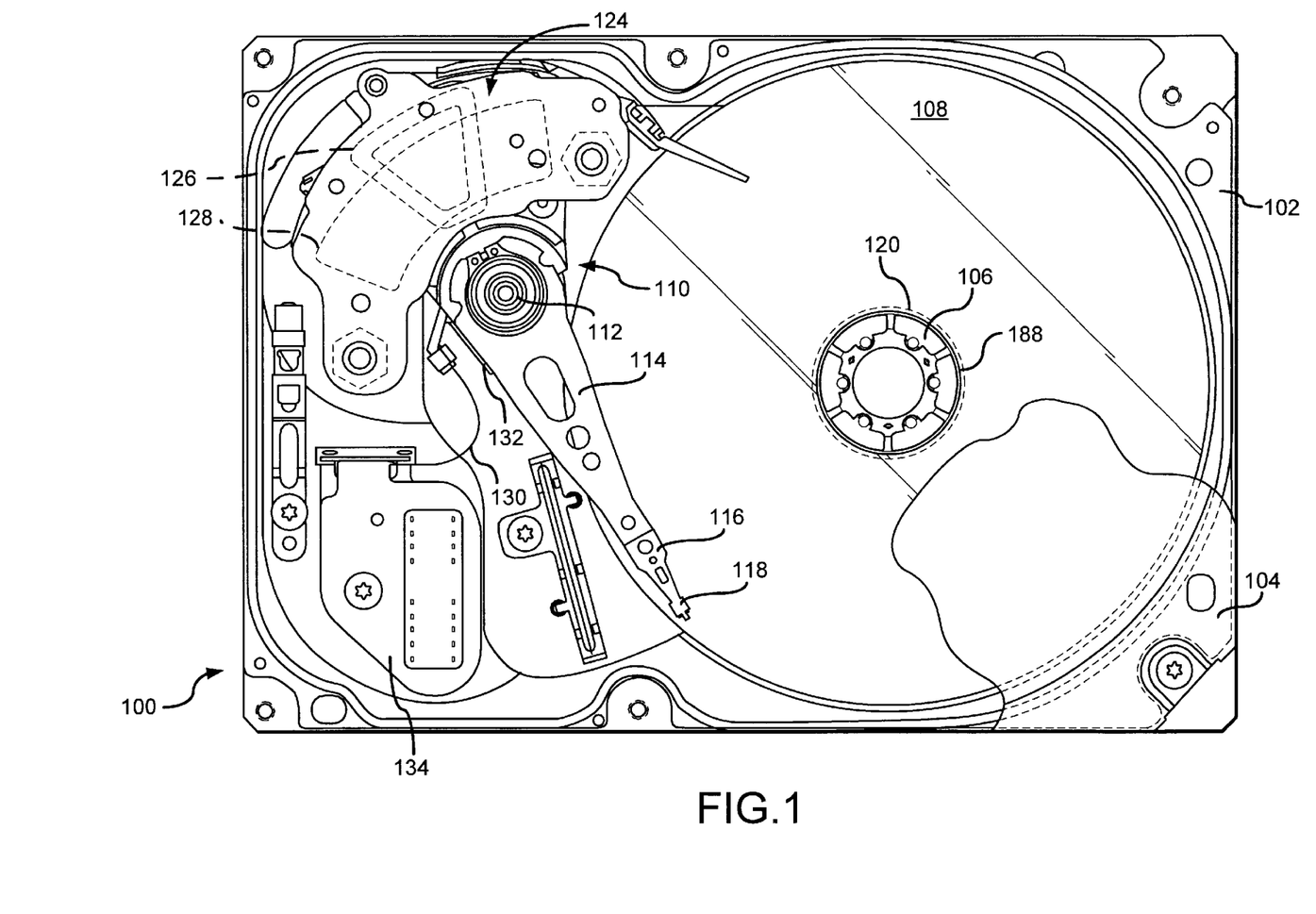
FIG. 1 is a plan view of a disc drive incorporating a preferred embodiment of the present invention and illustrating primary internal components of the disc drive.

A disc drive 100 constructed in accordance with a preferred embodiment of the present invention is shown in FIG. 1. The disc drive 100 includes a base plate 102 to which various components of the disc drive 100 are mounted. A top cover 104, shown partially cut away, cooperates with the base plate 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider (not shown) enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads 118 are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly 130 terminates at a flex bracket 134 for communication through the base plate 102 to a disc drive printed circuit board (not shown) mounted to the bottom side of the disc drive 100.

Figure 2:
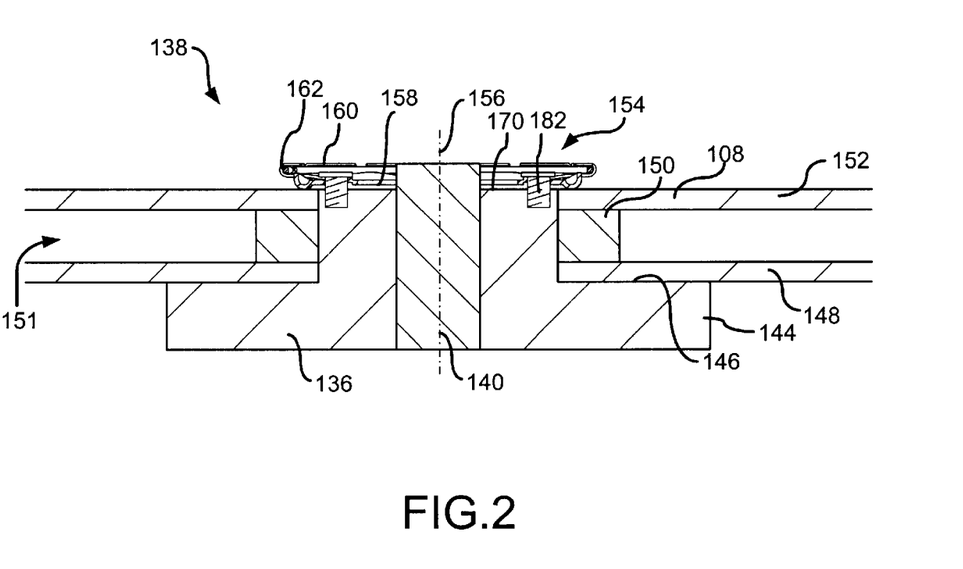
FIG. 2 is a representative cross sectional view of a disc stack illustrating a disc clamp assembly in accordance with a preferred embodiment of the present invention.

One or more information storage discs 108 are mounted on a spindle hub 136 as shown in FIG. 2. A typical spindle hub assembly 138 has a rotating hub 136 journaled to a non-rotating spindle shaft 140 where the spindle shaft 140 is attached to the base plate 102 and anchors the rotating hub 136 within the disc drive 100. Extending from a lower end of the rotating hub 136 is an annular flange 144 having a loading surface 146 for receiving a bottom information storage disc 148. An annular disc spacer 150 is stacked on the bottom information storage disc 148. A top information storage disc 152 is stacked on the disc spacer 150. The combination of information storage discs and disc spacers is referred to as a disc stack 151.

A disc clamp assembly 154 in accordance with a preferred embodiment of the present invention is secured to the spindle hub 136 and exerts a downward force on the information storage discs 108 and disc spacers 150. Note that while two discs 148 and 152 are discussed for purposes of FIG. 2, it is envisioned that one or more discs and corresponding spacer(s) may be used with the current invention as long as the number of discs and spacers fits within the tolerance limits of the particular disc drive.

One critical aspect to proper disc drive operation is that the spindle hub 136, information storage discs 108, disc spacers 150 and disc clamp assembly 154, i.e., the spindle hub assembly 138, have a cylindrical symmetry about the central axis of rotation 156 of the spindle hub 136. Cylindrical symmetry of the spindle hub assembly is the result of having a balanced spindle hub assembly 138, i.e., the center of gravity of the spindle hub assembly 138 is essentially positioned at the central axis of rotation 156 of the spindle hub 136. However, imperfections and cost considerations in design, manufacture and the assembly of the spindle hub assembly often result in variations in the center of gravity for the spindle hub assembly, thus resulting in an off-center center of gravity for the assembly.

The present invention provides a device and method for balancing the spindle hub assembly 138, and is implemented through embodiments of a disc clamp assembly 154 that includes a balance feature for the spindle hub assembly 138. Embodiments of the disc clamp assembly 154 of the present invention provide a simple and inexpensive solution for both securing the disc stack 151 to the spindle hub 136 and balancing, i.e., aligning the center of gravity and central axis of rotation 156 of the spindle hub assembly 138, the spindle hub assembly.

Referring again to FIG. 2, a spindle hub assembly 138 is shown having a balancing feature in accordance with an embodiment of the present invention. A disc clamp assembly 154 having a base piece 158, balance ring retainer piece 160 and balance ring 162 are shown, where the balancing ring 162 modifies the center of gravity of the spindle hub assembly 138 toward the central axis of rotation 156 of the spindle hub 136. When the center of gravity and central axis of rotation 156 of the spindle hub 136 are substantially aligned, rotational vibrations are minimized within the spindle hub assembly 138, thus reducing acoustic emissions and read/write disturbances.

Figure 6:
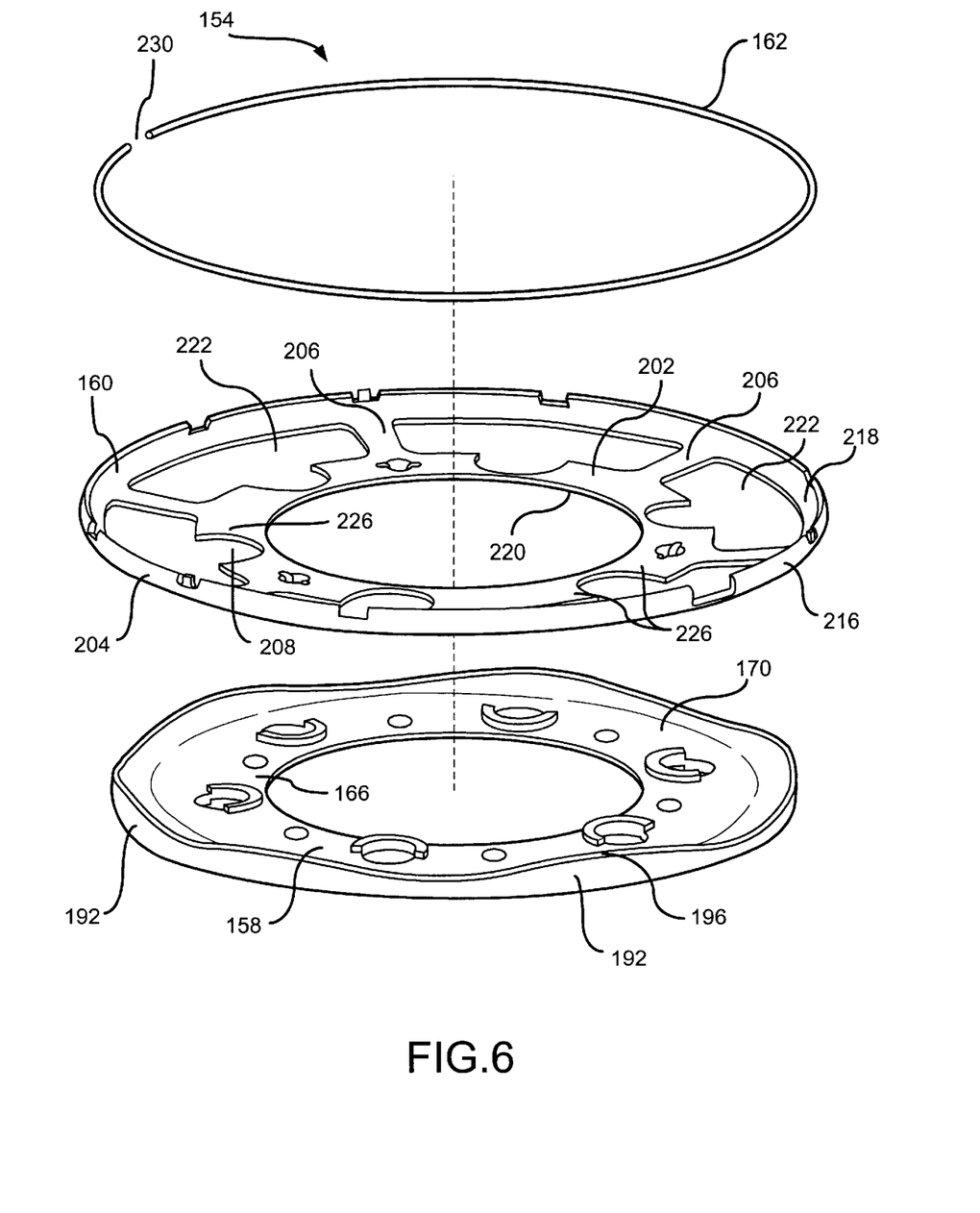
FIG. 6 is an exploded view of the base portion, the retainer portion, and a balance ring of the disc clamp assembly shown in FIG. 2.
Figure 7:
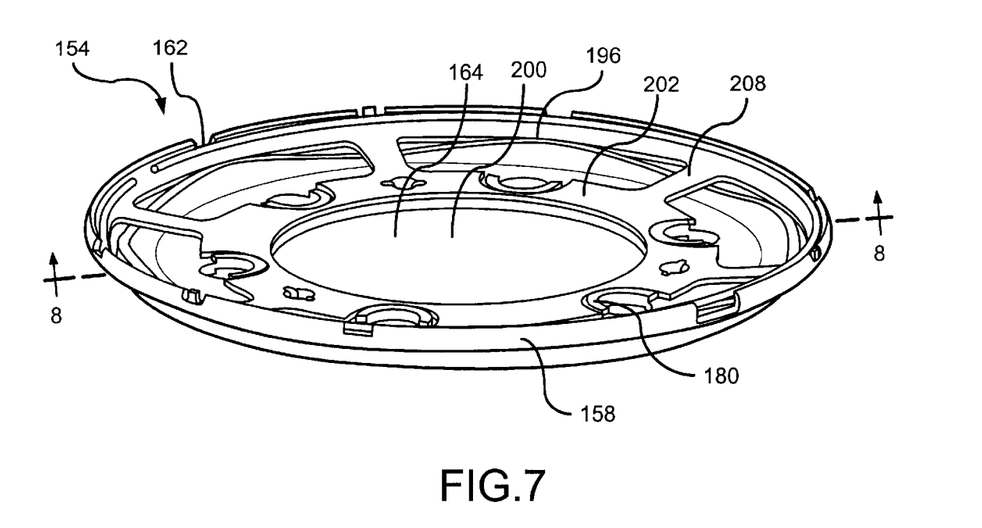
FIG. 7 is an isometric view of the disc clamp assembly shown in FIG. 2.
Figure 8:
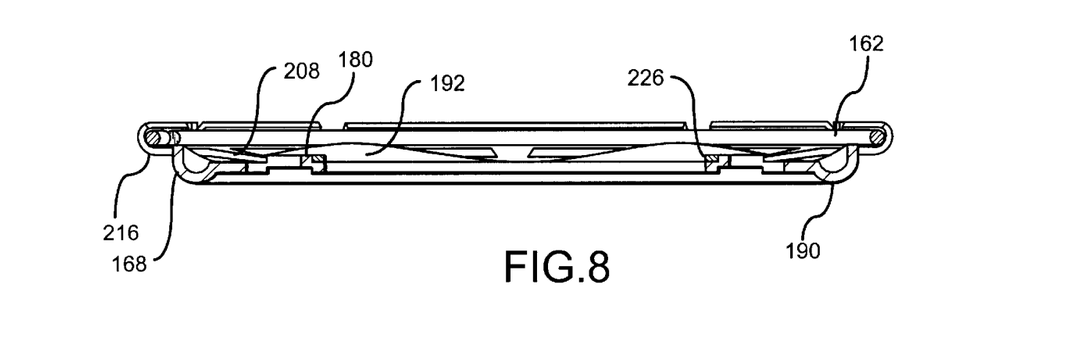
FIG. 8 is a cross-sectional view through the disc clamp assembly taken along line 8—8 in FIG. 7.

Preferred embodiments of the disc clamp assembly 154 of the present invention have a three piece design as shown in FIGS. 6–8: a bottom hub-engaging base piece 158 is secured to the spindle hub 136 and exerts a downward force on the disc stack 151; an upper balance ring retainer piece 160 attaches to the base piece 158 for receiving and securing a balance ring 162; and a balance ring 162 is received in the retainer piece 160 for modifying the balance of the spindle hub assembly 138. A mass of the balance ring 162, as determined by the total length of the balance ring 162, is selected for each particular spindle hub assembly 138 so as to modify the particular center of gravity for the spindle hub assembly 138 toward the central axis of rotation 156 of the spindle hub, as is discussed in greater detail below.

Figure 3:
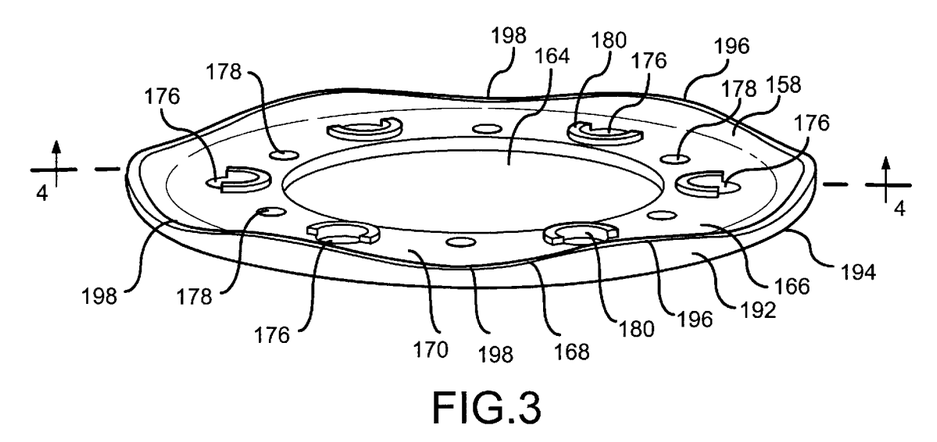
FIG. 3 is an enlarged isometric view of a base portion of the disc clamp assembly shown in FIG. 2.
Figure 4:
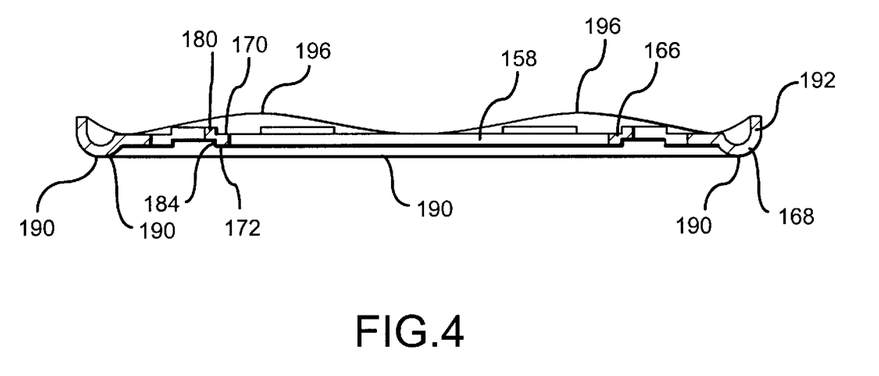
FIG. 4 is a cross-sectional view through the base portion of the disc clamp taken along line 4—4 in FIG. 3.

One embodiment of the base piece 158 of the disc clamp assembly 154 is shown in FIGS. 3 and 4. The base piece 158 is generally a disc having a central aperture 164 for mounting on the spindle shaft 140 and includes an annular hub engagement portion 166 and a peripheral annular rim 168.

The annular hub engagement portion 166 of the base piece 158 has flat top 170 and bottom surfaces 172, and is shaped and sized to mimic the shape and size of the top surface 174 of the spindle hub 136 (see FIG. 2). Six screw holes 176 are spaced an equal distance from each other in the annular hub engagement portion 166 around the central aperture 164, and equally spaced between every two screw holes 176 is a slot or opening 178 for engagement with the balance ring retainer 160 which is described in greater detail below. Six screw holes 176 and corresponding slots 178 are shown for illustrative purposes, although other numbers of screw holes 176 and slots 178 may be used in the present invention, where the greater number of screw holes provides for a more even load being applied by the base piece on the top surface 174 of the spindle hub 136.

A series of semi-circular shaped rims 180 (FIGS. 3 and 4) extend above the top surface 170 of the hub engagement portion 166 of the base piece 158 to partially surround each screw hole 176. Each raised rim 180 extends around an inner portion of the screw hole 176 and is positioned between the central aperture 164 and the peripheral rim 168. Each raised rim 180 provides a shoulder for directly receiving/contacting a disc clamp retaining screw 182 used to secure the disc clamp base piece 158 to the top surface 174 of the spindle hub 136 as shown in FIG. 3. The raised rims 180 minimize pressure hotspots on the information storage disc formed by the downward torque of the clamp retaining screws 182, as is described and discussed in greater detail below.

The bottom surface 172 of the annular hub engagement portion 166 is smooth and flat for engagement with the top surface 174 of the spindle hub 136. Six semi-circular shaped indentations 184, positionally in-line with the raised rims 180 on the top surface 174 of the hub engagement portion 166, are defined around the inside half of each screw hole 176. The indentations result from formation of the raised rims 180.

Peripheral to the hub engagement portion 166 of the base piece 158 is the annular shaped rim portion 168. When positioned on the spindle hub 136, the rim portion 168 sits beyond the outer surface 186 of the spindle hub 136 and is axially aligned with the inner circumference 188 (FIG. 1) of the top information storage disc 152. (FIG. 2) As shown in FIG. 4, the peripheral rim 168 has a generally U-shaped cross section, where the bottom of the U defines an information storage disc engagement surface 190 and the peripheral arm of the U forms an upwardly extending ring of pressure lobes 192. When the base piece 158 of the disc clamp assembly 154 is loaded on the spindle hub 138, the ring-shaped information storage disc engagement surface 190 extends below the hub engagement portion 166 of the base piece 158 and is coplanar with the top surface of the top information storage disc 152 to uniformly engage the top information storage disc 152. The downward torque of the clamp retaining screws 182 into the top surface 174 of the spindle hub 136 is uniformly translated to a downward axial force through the engagement surface 190.

The pressure lobes 192 of the rim portion 168 are six uniformly shaped upwardly curved extensions, where the curve peak 196 of each lobe 192 is positioned laterally in-line with the center of each of the six screw holes 176, and the curve minimums 198 on either side of a curve maximum 196 are positioned laterally in-line with each slot 178. Each pressure lobe 192 spreads and distributes the force being translated from the torqued clamp retainer screw 182.

The base piece 158 of the disc clamp assembly 154 is preferably made of aluminum, stainless steel, or another suitable malleable metal. In preferred embodiments, the base piece 158 is stamped or formed from stainless steel sheet metal.

Figure 5:
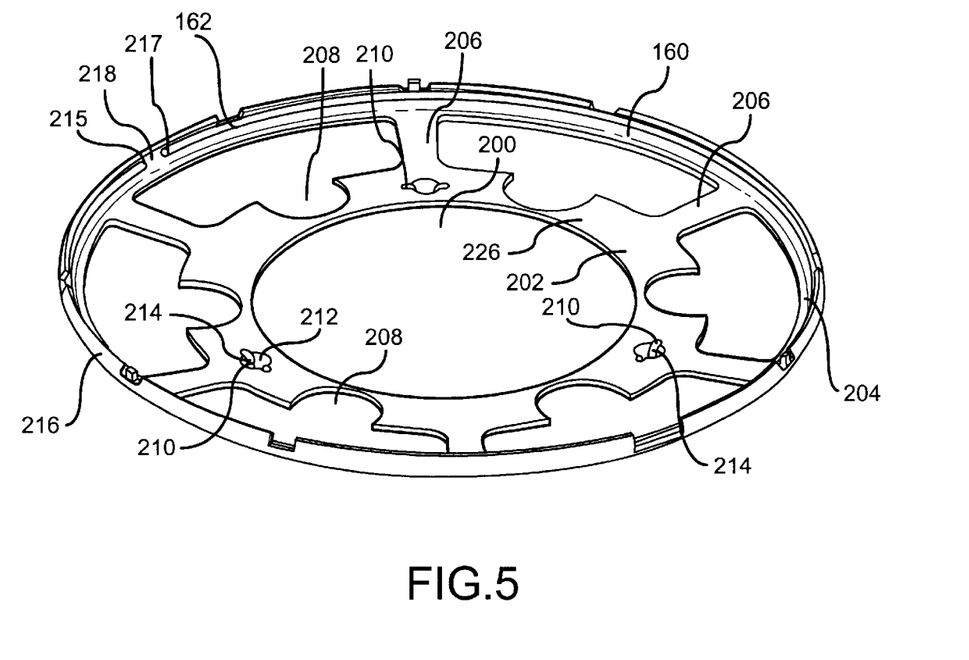
FIG. 5 is an enlarged isometric view of a retainer portion of the disc clamp assembly shown in FIG. 2.

One embodiment of the balance ring retainer piece 160 of the disc clamp assembly 154 of the present invention is shown in perspective view in FIG. 5. The balance ring retainer piece 160 has an overall circular shape with a central aperture 200 and includes a central web portion 202 spaced from a peripheral balance ring accepting portion 204 by a series of radial ribs or spokes 206.

The central web portion 202 of the balance ring retainer piece 160 is a generally circular shape ring that surrounds the central aperture 200. The central aperture 200 is of such size and shape so as to be snugly received by the spindle shaft 140 of the spindle hub assembly 138 and in general has a similar shape and size as the central aperture 164 in the base piece.

In the preferred embodiment shown in FIG. 5, six equally spaced apart radially extending ribs 206 extend from the central web portion 202 to the peripherally located balance ring accepting portion 204 of the balance ring retainer 160. The ribs are narrow strips, having flat top and bottom surfaces in-line with the central web portion 202 and the peripheral balance ring accepting portion 204.

Defined between each set of two ribs 206 in the central web portion 202 is an arcuate shaped cut-out 208. Each cut-out 208 provides access for one of the partially raised rims 180 that extend from the base piece 158 of the disc clamp assembly 154 when the base piece and balance ring retainer piece are engaged. The cut-outs 208 assists in aligning the base piece 158 with the balance ring retainer piece 160, as shown in FIG. 7.

Three male snaps 210, equally spaced from each other in the central web portion 202 of the balance ring retainer piece 160, protrude downwardly from the bottom surface of the central web portion of the retainer piece 160. Each snap 210 has an opening 212 and two opposed downwardly extending protrusions 214, each protrusion 214 of a snap 210 being outwardly biased where one protrusion extends from one half of the opening 212 and the second protrusion extends from the other half of the opening 212. In use, each snap 210 inserts into one of the axially aligned receiving slots 178 in the base piece 158 of the disc clamp assembly 154 and thereby aligns and snaps together the base piece 158 to the balance ring retainer piece 160 of the disc clamp assembly. The snap protrusions 214 frictionally engage the inner surface of the slots 178 in the base piece 158 to hold the two pieces of the disc clamp assembly 154 together. The engagement is sufficient to keep the parts together during shipment, and assembly of the disc clamp assembly 154 onto the spindle hub 136. Note that other attachment means, including but not limited to adhesives, are envisioned to be within the scope of the present invention, as long as the attachment is sufficient to hold the retainer piece 160 together with the base piece 158 during shipment and presentation to the spindle hub 136.

The peripheral balance ring accepting portion 204 of the balance ring retainer piece 160 has an annular shape upwardly bent rim 216 that defines a groove 218 for receiving and retaining a balance ring 162.

The balance ring retainer 160 may be formed from a metal such as aluminum or stainless steel, or may be formed from a plastic material. Preferred embodiments of the balance ring retainer 160 are stamped from stainless steel sheet metal or are formed from injected molded plastic. Preferable plastics for use with the present invention do not outgas and include, but are not limited to, polycarbonate, PPS, and the like.

The balance ring 162 itself is preferably a flexible piece of spring wire having a first end 215 and a second end 217. The spring wire length is less than the inside perimeter length of the peripheral balance ring accepting portion 204. Spring wire length for use with a particular balance ring retainer piece 160 is determined so as to modify the center of gravity for the spindle hub assembly 138 toward the central axis of rotation 156 of the spindle hub 138. Placement of the balance ring 162 in the balance ring retainer piece 160 entails compressing the balance ring 162 to a diameter smaller than the diameter of the balance ring retainer piece 160 and releasing the balance ring 162 in the groove 218 to outwardly press against the upwardly bent rim for frictional engagement with the balance ring retainer piece. Note that the length of the gap between the first end 215 and the second end 217 of the balance ring 162 determines the mass of the balance ring.

With reference to FIGS. 6–8, the balance ring retainer piece 160 and the base piece 158 of the disc clamp assembly 154 align with each other so that the bottom surface 220 of the central web portion 202 of the balance ring retainer 160 sits on the top surface 170 of the central hub engagement portion 166 of the base piece 158. The diameter of the base piece 158 is smaller than the diameter of the balance ring retainer piece 160 so that the upwardly extending pressure lobes 192 at the periphery of the base piece 158 extend upwardly into a space 222 between the central web portion 202 and peripheral balance ring retaining portion 204 of the balance ring retainer 160. The maximum peak 196 of each pressure lobe 192 sits equally between any two radial ribs 206 that connect the central web portion 202 and peripheral balance ring accepting portions 204 of the balance ring retainer 160. Additionally, as noted above, each raised rim 180 of the base piece 158 extends into the cut-out 208 defined in the central web portion 202 of the balance ring retainer piece 160. Once the base piece 158 and balance ring retainer piece 160 are engaged, each raised rim 180 extends to substantially the same height as the thickness of the central web portion 202 of the balance ring retainer 160 so that a top surface of the rims 180 are flush with the top surface of the central web portion 202.

In use, the base piece 158 and balance ring retainer piece 160 are snapped together and the central apertures 164, 200 for each piece are positioned around the spindle shaft 140. The base piece 158 sits on the top surface 174 of the spindle hub 136 so that the screw holes 176 of the base piece 158 are axially aligned with corresponding screw holes 224 (see FIG. 2) in the spindle hub 136. Each screw 182 is torqued into the spindle hub 136 until the screw 182 contacts the area 226 adjacent the cut-out 208 of the central web portion 202 of the balance ring retainer piece 160, compressing the central web portion 202 downward onto the top surface 170 of the central hub engagement portion 166 of the base piece 158. Each screw 182 is torqued into the spindle hub 136 until the screw head 228 comes to rest on the raised rim 180 of the base piece 158 thereby directly applying a downward force on the base piece 158 that is translated to the information storage disc engagement edge 190 as an axial downward clamping force on the disc stack. Note that the raised rim 180 also evens out and distributes the force exerted by the screw 182 onto the base piece 158 thereby providing a more uniform downward clamping force at the periphery of the base piece of the disc clamp assembly. The raised rim feature 180, in association with the pressure lobe feature 192, remove any pressure "hotspots" caused by the torqued screws and provide for a substantially flush connection between the base piece 158 and the top surface 170 of the hub, and hence a more uniform downward clamping force on the top information storage disc 108. The uniform clamping force on the disc prevents distortion during temperature changes within the disc drive and is therefore advantageous to the operation of the disc drive 100.

Once the base piece 158 and balance ring retainer piece 160 are secured to the spindle hub 138, the center of gravity for that particular spindle hub assembly can be determined by means well known within the art. For instance, the disc stack may be spun, and the resulting forces measured with an accelerometer coordinated with an index mark on the ring retainer. The appropriate spring wire is selected from the information provided by the accelerometer, i.e., the correct mass/length of spring wire is selected, compressed into a curved ring and aligned over the balance ring retainer 160 so as to align the gap 230 in the balance ring 162 in such a manner as to move the center of gravity of the spindle hub assembly toward the center of rotation. The curved spring wire is compressed to a smaller diameter than the balance ring retainer piece 160 diameter and released into proper position in the peripheral ring portion 204 where the spring wire is frictionally engaged within the groove 218.

Figure 9:
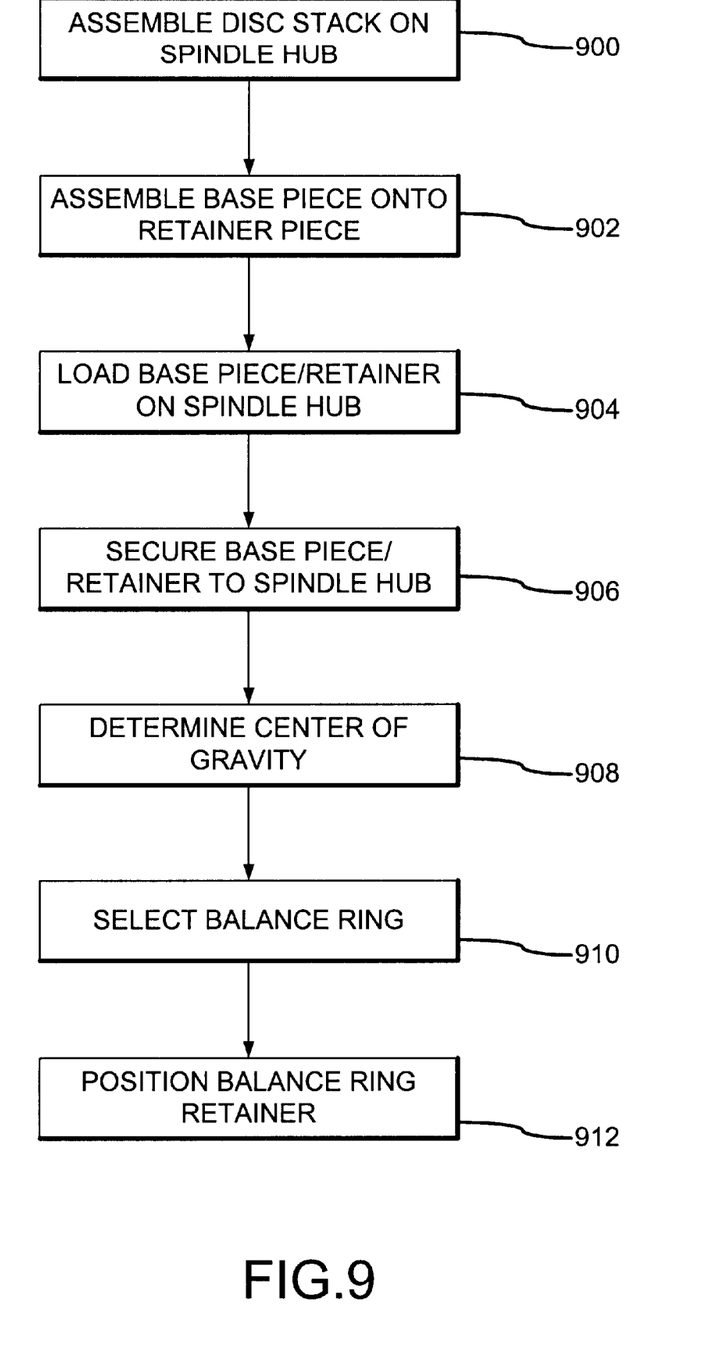
FIG. 9 is a process flow diagram for balancing a spindle hub assembly in conformity with one embodiment of the present invention.

One method for balancing a spindle hub assembly 138 in conformity with the present invention is shown in FIG. 9. In operation 900, a disc stack 151 (information storage discs and associated disc spacers) is assembled on the spindle hub 136 of the disc drive spindle motor 106. In operation 902, the base piece 158 and balance ring retainer piece 160 of the disc clamp assembly 154 are attached together through the male snaps 210 on the retainer piece being frictionally engaged by the slots 178 in the base piece. In operation 904, the assembly of the base piece and the balance ring retainer piece is positioned over the spindle shaft 140 and on the top surface 174 of the spindle hub 136 so that the peripheral disc engagement surface 190 is positioned against the top information storage disc 152 mounted on the spindle hub. In operation 906, the appropriate number of screws 182 are used to secure the spindle hub 136 to the base piece 158 and balance ring retainer piece 160. In operation 908, the center of gravity for the spindle hub assembly 138, i.e., the spindle hub, disc stack, base piece and retainer piece, is determined. In operation 910, a balance ring 162 having the correct mass is selected for balancing the spindle hub assembly. In operation 912, the appropriate balance ring 162 is positioned in the balance ring retainer 160 to modify the center of gravity of the spindle hub assembly toward the central axis of rotation of the spindle hub. Finally, the assembly may go through a balance verification for process control.

In summary, the preferred embodiment of the invention described herein is directed to a disc clamp assembly (such as 154) for exerting a clamping force on a disc stack (such as 151) to secure the disc stack to a spindle hub (such as 136) and form a spindle hub assembly (such as 138). The disc clamp assembly (such as 154) modifies the center of gravity of the spindle hub assembly toward a central axis of rotation (such as 156) of the spindle hub (such as 136). The disc clamp assembly (such as 154) includes a disc shaped base piece (such as 158) having a top surface (such as 170) and a bottom surface (such as 172), the bottom surface for contacting a top surface (such as 174) of the spindle hub (such as 136), a periphery of the base piece (such as 158) having a downward extending annular ring (such as 168) for contacting a top information storage disc (such as 108) of the disc stack (such as 151). The disc clamp assembly also includes a disc shaped retainer piece (such as 160) engaged to the top surface (such as 170) of the base piece (such as 158), the retainer piece having a peripheral balance ring receiving portion (such as 204) for receiving a balance ring (such as 162). The balance ring has a first end (such as 215) and a second end (such as 217) and an intervening gap therebetween. The balance ring (such as 162) has a predetermined mass and is secured within the peripheral balance ring receiving portion (such as 204) of the retainer piece (such as 160) to modify the center of gravity of the spindle hub assembly toward the central axis of rotation of the spindle hub.

In other preferred embodiments of the present invention, the base piece (such as 158) or retainer piece (such as 160) may be stamped from stainless steel sheet metal. In an alternative embodiment, the retainer piece may be plastic.

In another preferred embodiment of the invention, the balance ring (such as 162) is a spring wire, the spring wire is curved and compressed to frictionally sit within the peripheral balance ring receiving portion (such as 204) of the retainer piece (such as 160). In a further embodiment, the predetermined mass of the balance ring (such as 162) is adjusted by varying the length of the spring wire.

In another preferred embodiment of the invention, the base piece (such as 158) includes a series of equally spaced apart holes (such as 176) for receiving screws (such as 182) to secure the base piece (such as 158) to the top surface (such as 174) of the spindle hub (such as 136); and a raised rim (such as 180) partially surrounds each hole (such as 176) to contact a head of the screw received within the hole. In another embodiment, the retainer piece (such as 160) has a central web portion (such as 202) defining a series of cut-outs (such as 208), each cut-out receiving a raised rim (such as 180) from the base piece (such as 158) so that a top surface of the retaining piece (such as 160) is substantially flush with a top surface of the raised rim (such as 180) to allow the screw head to simultaneously secure both the base piece (such as 158) and the retainer piece to the top surface (such as 174) of the spindle hub (such as 136). In anther embodiment, the base piece (such as 158) may include a series of upwardly extending pressure lobes (such as 192) located about the periphery of the base piece, the pressure lobes adjacent each spaced apart screw hole (such as 176) to help distribute the downward force applied by the screws to the base piece. In another embodiment, the central web portion (such as 202) of the retainer piece (such as 160) defines a series of equally spaced apart downwardly extending snaps (such as 210), each snap (such as 210) is frictionally received by a corresponding slot (such as 178) formed in the central hub engagement portion (such as 166) of the base piece.

A further preferred embodiment of the invention described herein is directed to a balance ring retainer (such as 160) for balancing a spindle hub assembly (such as 138). The balance ring retainer has an annular shaped central web portion (such as 202) for operative attachment to the spindle hub (such as 136) and a peripheral balance ring accepting portion (such as 204) for accepting a balance ring (such as 162). The balance ring has a first end (such as 215) and a second end (such as 217), where the length of distance between the two ends of the balance ring determines the mass of the balance ring. The mass of the balance ring (such as 162) being selected to improve the balance of the spindle hub assembly (such as 138).

In another embodiment of the invention, the annular shaped central web portion (such as 202) defines a series of equally spaced apart cut-outs (such as 208), each cut-out receiving a screw for operatively attaching the balance ring retainer (such as 160) to the spindle hub assembly (such as 138). Note also that the balance ring retainer (such as 160) may have a groove (such as 218) for frictionally the balance ring (such as 162). Finally, the annular shaped web portion (such as 202) of the balance ring retainer (such as 162) may have a plurality of snaps (such as 210) for engaging a series of corresponding holes or slots (178) on the disc clamp (such as 158) so as to attach the balance ring retainer to the disc clamp.

A further preferred embodiment of the invention described herein is directed to a method of balancing a spindle hub assembly (such as 138) within a disc drive (such as 100). The method includes the steps of assembling a disc stack on a spindle hub of a disc drive spindle motor (such as in operation 900); assembling a disc clamp assembly having a base piece and a balance ring retainer piece (such as in operation 902); positioning the disc clamp assembly on the spindle hub so that the base piece engages both the spindle hub and a top surface of an information storage disc in the disc stack (such as in operation 904); determining the center of gravity of a spindle hub assembly where the assembly includes the spindle hub, disc stack and disc clamp assembly (such as in operation 908); and positioning a balance ring having a predetermined mass in the balance ring retainer piece of the disc clamp assembly to move the center of gravity of the spindle hub assembly toward a central axis of rotation for the spindle hub assembly (such as in operation 912).

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. A disc clamp assembly for exerting a clamping force on a disc stack to secure the disc stack to a spindle hub to form a spindle hub assembly, and for modifying the center of gravity of the spindle hub assembly toward a central axis of rotation of the spindle hub, the disc clamp assembly comprising:

a disc shaped base piece having a top surface and a bottom surface, the bottom surface for contacting a top surface of the spindle hub, a periphery on the base piece including a downwardly extending annular ring for contacting a top information storage disc of the disc stack;

a disc shaped retainer piece engaged to the top surface of the base piece, the retainer piece having a peripheral balance ring receiving portion for receiving a balance ring; and     a balance ring having a first end and a second end and an intervening gap therebetween, wherein the balance ring has a predetermined mass, the balance ring secured within the peripheral balance ring receiving portion of the retainer piece to modify the center of gravity of the spindle hub assembly toward the central axis of rotation of the spindle hub.

2. The disc clamp assembly of claim 1 wherein the base piece is stamped from stainless steel sheet metal.

3. The disc clamp assembly of claim 1 wherein the retainer piece is stamped from stainless steel sheet metal.

4. The disc clamp assembly of claim 1 wherein the retainer piece is plastic.

5. The disc clamp assembly of claim 1 wherein the balance ring is a spring wire, the spring wire curved and compressed to frictionally sit within the peripheral balance ring receiving portion of the retainer piece.

6. The disc clamp assembly of claim 5 wherein the predetermined mass of the balance ring is adjusted by utilizing a length of the spring wire.

7. The disc clamp assembly of claim 1 wherein the base piece further includes: a series of equally spaced apart holes for receiving screws to secure the base piece to the top surface of the spindle hub; and a raised rim partially surrounding each hole to contact a head of the screw received within the hole.

8. The disc clamp assembly of claim 7 wherein the retainer piece has a central web portion defining a series of cut-outs, each cut-out receiving a raised rim from the base piece so that a top surface of the retaining piece is substantially flush with a top surface of the raised rim to allow the screw head to simultaneously secure both the base piece and the retainer piece to the top surface of the spindle hub.

9. The disc clamp assembly of claim 7 wherein the base piece includes a series of upwardly extending pressure lobes located about the periphery of the base piece, the pressure lobes positioned adjacent each spaced apart screw hole to help distribute the downward force applied by the screws to the base piece.

10. The disc clamp assembly of claim 8 wherein the central web portion of the retainer piece defines a series of equally spaced apart downwardly extending snaps, each snap is frictionally received by a corresponding slot formed in the central hub engagement portion of the base piece.

11. The disc clamp assembly of claim 1 wherein the retainer piece is releasably attached to the base piece for shipment and delivery of the disc clamp assembly to the spindle hub.

\* \* \* \* \*